G. A. ROBINSON & F. GRINHAM.
TAIL LIGHT AND TRAFFIC SIGNAL FOR AUTOMOBILES.
APPLICATION FILED JAN. 23, 1911.

996,144.

Patented June 27, 1911.

Attest
a. J. McCauley
E. L. Wallace

Inventors
G. A. ROBINSON
F. GRINHAM
by Higdon & Longan
Attys

UNITED STATES PATENT OFFICE.

GEORGE A. ROBINSON AND FREDRICK GRINHAM, OF ST. LOUIS, MISSOURI.

TAIL-LIGHT AND TRAFFIC-SIGNAL FOR AUTOMOBILES.

996,144.

Specification of Letters Patent. Patented June 27, 1911.

Application filed January 23, 1911. Serial No. 604,018.

*To all whom it may concern:*

Be it known that we, GEORGE A. ROBINSON and FREDRICK GRINHAM, citizens of the United States, and residents of St. Louis, in the State of Missouri, have invented certain new and useful Improvements in Tail-Lights and Traffic-Signals for Automobiles, of which the following is a specification containing a full, clear, and exact description, reference being had to the accompanying drawings, forming a part hereof.

Our invention relates to an improved tail light and traffic signal for automobiles, and consists in the novel construction and arrangement of parts hereinafter described and pointed out in the claim.

The object of our invention is to provide an improved tail light and traffic signal for automobiles, which will prevent rear collisions in city streets.

Figure 2:
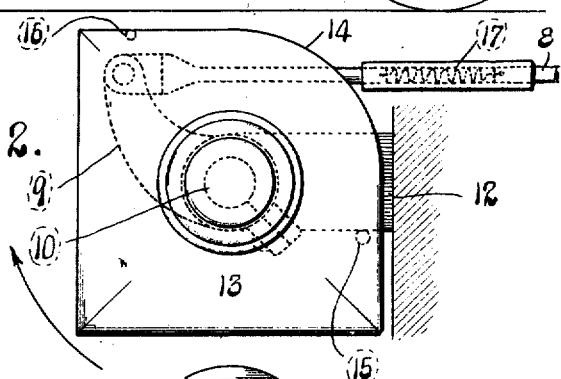
Figure 4:
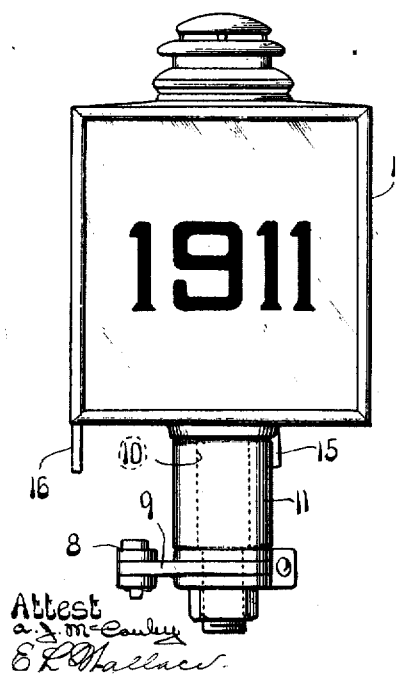
Figure 3:
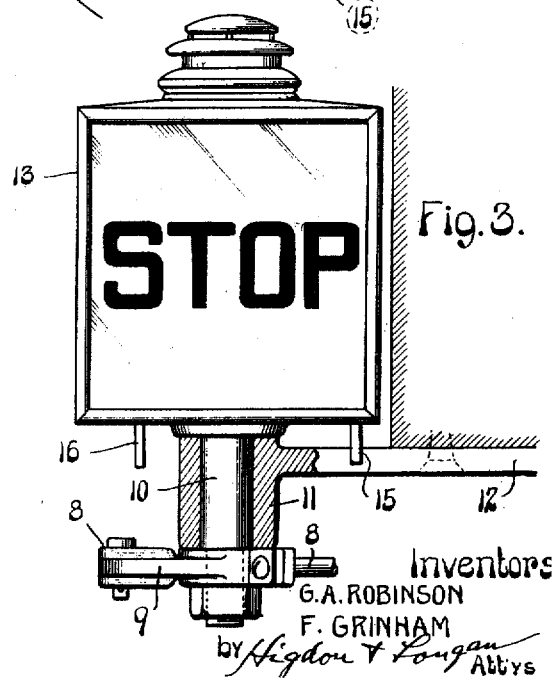

In the drawings: Figure is a side elevation of a common automobile, with parts broken away, and having our invention applied thereto; Fig. 2 is a sectional detail plan view of the rear portion of a vehicle having our improved automatic tail light applied thereto; Fig. 3 is a sectional side elevation of the parts shown in Fig. 2; and Fig. 4 is a rear elevation of the tail light in its normal position.

Referring by numerals to the accompanying drawings: the automobile is provided with the usual foot or hand brake lever 1, from which extends the usual connections 2 and 3 to the brake 4 on the rear wheels 5, the connections bein .uch that whenever the operating lever 1 moved forward the usual rock shaft 6 is partly rotated. Mounted on said rock shaft 6 in the usual manner is an ordinary short crank arm 7, to which the forward end of a tail light rod 8 is pivotally connected. The rear end of the light rod 8 is pivotally connected to the crank arm 9, fixed upon the lower end of the vertical lamp journal 10, which latter is mounted in a bearing 11, carried by the rear end of the bracket 12. The br cket 12 is fixed upon the rear portion of the vehicle by suitable bolts or rivets, so that the light or lamp 13 will be carried closely adjacent the rear of the vehicle body, preferably near the left hand side thereof.

The lamp 13 may be of any ordinary construction, with the exception that it has the  .irn.al 10 fixed at its lower end, and one corner of said lamp is preferably rounded off, as indicated at 14, so that the lamp may thereby be operated closer to the body of the vehicle. The interior of the lamp is of the ordinary construction, and is of course fitted with the usual concave reflector and lighting attachment, which may be either an oil lamp or supplied with gas or electricity.

Suitable stop pins or lugs 15 and 16 project downwardly from the body of the lamp and come in contact with the edges of the bracket 12, to limit the movement of the lamp.

The light rod 8 is preferably provided with a yielding section intermediate of the crank arms 7 and 9, for the purpose of permitting the said light rod to move a greater distance forward or back than is necessary to set the tail light during operation, thereby preventing possible breakage of said pins 15 and 16. This yielding connection in the rod 8 permits the brake lever 1 to be moved a greater distance than is necessary to operate the tail light, and thereby permits the brake connections to become comparatively slack by reason of wear, without interfering with the active operation of the tail light. The said yielding section of the light rod 8 may be provided in any known manner, but in the present case we have shown (see Fig. 2) the rod in two sections with a coiled spring 17 connecting the ends of the sections. It will be understood that the said yielding section of the rod 8 as shown, permits said rod to both push and pull the lamp to operate the same.

The lamp 13 is provided with two faces, on one of which is printed, or painted as in the present case the number of the automobile license, "1911," while on the adjacent face is printed the traffic signal "Stop."

Our device may be used as well in the day time as at night.

Figure 1:
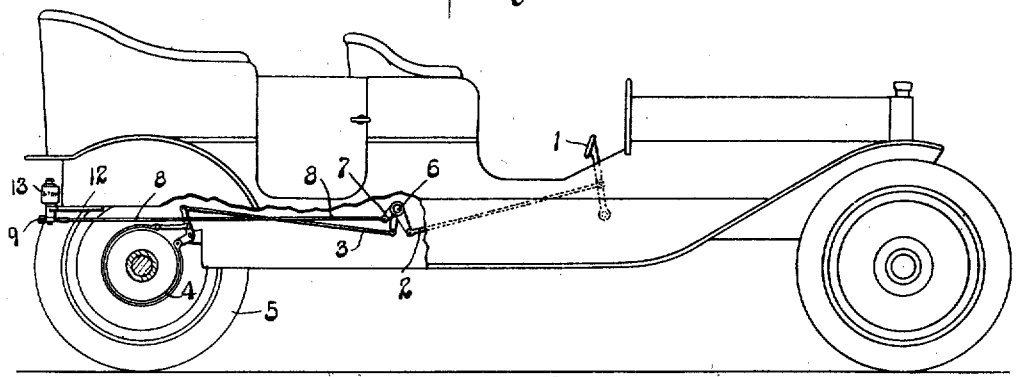

The operation is as follows: The normal position of the parts is that indicated in Figs. 1, 2 and 3 of the drawing, in which the lamp is positioned, with the signal "Stop" out of the range of vision of drivers in the rear, but with the automobile number "1911" in plain view of drivers who are at the rear of the vehicle carrying the signal. When the driver desires to stop, he presses his foot upon the brake lever 1 (or operates the brake lever with his hands if it be a hand brake), thereby moving said lever, rotating the rock shaft 6, throwing the crank arm 7 forward, and such movement carries forward also the light rod 8 and the crank arm 9 of the lamp, thereby rotating the journal 10 of the lamp and correspondingly rotating the lamp upon its bracket 12, and this movement will continue until the stop pin 16 comes in contact with the adjacent edge of the said bracket 12, when the lamp will stand in such position that the signal "Stop" will be exhibited to the drivers in the rear, and they will thereupon stop their vehicles promptly and prevent possible rear collisions. When the driver releases the brakes, they return to their normal position (by the usual means and in the usual manner), and the light rod 8 causes the lamp to return to its normal position to exhibit the automobile number "1911" in the rear, while the signal "Stop" will be exhibited at the side of the vehicle, out of view of drivers in the rear.

We claim:

A tail-light traffic-signal for vehicles, comprising a brake-lever, a brake, a tail-light rotatably mounted in the rear of the vehicle, a pushing-and-pulling rod connecting the said tail-light and the said brake-lever by a yielding connection, a bracket upon which said tail-light is rotatably mounted, and stop-pins projecting downwardly from said lamp to contact with said bracket and thereby limit the movement of the said tail-light.

In testimony whereof, we have signed our names to this specification, in presence of two subscribing witnesses.

GEORGE A. ROBINSON.
FREDRICK GRINHAM.

Witnesses:
E. L. WALLACE,
JOHN C. HIGDON.